US008880832B2

(12) United States Patent
Namba et al.

(10) Patent No.: US 8,880,832 B2
(45) Date of Patent: Nov. 4, 2014

(54) CONTROLLER FOR STORAGE DEVICES AND METHOD FOR CONTROLLING STORAGE DEVICES

(75) Inventors: Yoshiki Namba, Kanagawa-ken (JP); Keiji Yamamoto, Tokyo (JP); Taichi Tashiro, Tokyo (JP); Hiroyuki Nishikawa, Saitama-ken (JP); Kohta Nakamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 13/568,203

(22) Filed: Aug. 7, 2012

(65) Prior Publication Data

US 2013/0046942 A1    Feb. 21, 2013

(30) Foreign Application Priority Data

Aug. 15, 2011    (JP) ................................ P2011-177628

(51) Int. Cl.
 *G06F 12/00*    (2006.01)
 *G06F 3/06*    (2006.01)
(52) U.S. Cl.
 CPC ............ *G06F 3/0611* (2013.01); *G06F 3/0688* (2013.01); *G06F 3/0659* (2013.01)
 USPC ................... 711/167; 711/E12.069
(58) Field of Classification Search
 USPC ........................................................ 711/167
 See application file for complete search history.

(56) References Cited

U.S. PATENT DOCUMENTS

2008/0307192 A1*  12/2008  Sinclair et al. ................ 711/218

FOREIGN PATENT DOCUMENTS

| JP | 06332626   | 12/1994 |
|----|------------|---------|
| JP | 2001005724 | 1/2001  |
| JP | 2003108314 | 4/2003  |
| JP | 2006085243 | 3/2006  |
| JP | 2006227923 | 8/2006  |
| JP | 2010102369 | 5/2010  |

OTHER PUBLICATIONS

Japan Patent Office Official Action dated Jul. 16, 2013.

* cited by examiner

*Primary Examiner* — Reginald Bragdon
*Assistant Examiner* — Hamdy S Ahmed
(74) *Attorney, Agent, or Firm* — Baker Botts L.L.P.

(57)    ABSTRACT

A controller is connectable to a host system and a plurality of storage devices. A monitor unit monitors operating status of a plurality of storage devices and sets the operating status of the storage devices in a status table. Upon receiving a write command from the host system, a command responding unit receives write data sent from the host system within a certain period of time after the write command, holds the write data received in a buffer memory, instructs a timer to start counting, sets a write destination for data in the status table, outputs a control signal that gives an instruction to write data to the storage device of the write destination, and returns a write completion response corresponding to the write command to the host system when receiving the deadline notification from the timer.

17 Claims, 10 Drawing Sheets

25 Status table

| SSD operating status flag | 0: Waiting<br>1: Writing |
| --- | --- |
| Write destination flag | 0: SSD3 is write-enabled (SSD4 is write-disabled), SSD4 is read-enabled<br>1: SSD4 is write-enabled (SSD3 is write-disabled), SSD3 is read-enabled |

*FIG. 2*

CONTROLLER FOR STORAGE DEVICES AND METHOD FOR CONTROLLING STORAGE DEVICES

CROSS-REFERENCE TO RELATED APPLICATION

This application is based upon and claims the benefit of priority from the prior Japanese Patent Application No. 2011-17762, filed on Aug. 15, 2011, the entire contents of which are incorporated herein by reference.

FIELD

Embodiments of the present invention relate to a controller for storage devices and a method for controlling storage devices.

BACKGROUND

An information processing apparatus for industrial use which delivers in real time video contents stored in a video server or the like includes storage devices such as hard disk drives having large storage areas.

The information processing apparatus of such a type needs to complete the process of writing or reading data within a given period of time. This is because if the time taken to write or read data exceeds a predetermined period of time, video or sound could be interrupted.

Hard disk drives have large storage areas and are in low in price but have disadvantages in speed and reliability. In recent years, therefore, solid state drives (hereinafter, referred to as SSDs) are used as high-speed storage devices in systems for industrial use (for example, see JP, P2010-102369A).

However, SSDs having larger storage areas for use in systems for industrial use are expensive. It is therefore desired to use low-cost and general-purpose SSDs which can be connected with general-purpose interfaces such as serial ATA.

As for the storage devices such as general-purpose SSDs, delay time for the process of writing or reading data is not guaranteed. This sometimes causes the information processing apparatuses to delay in the process of data processing. Accordingly, the storage devices such as general-purpose SSDs cannot be used as they are in apparatuses conducting real time control.

BRIEF DESCRIPTION OF THE DRAWINGS

FIG. 2 shows contents of a status table;

DETAILED DESCRIPTION

According to one embodiment, a controller is connectable to a host system and a plurality of storage devices. The controller includes a status table, a monitor unit, a buffer memory, a timer, a command responding unit, and a data processing unit. In the status table an operating status of the plurality of storage devices and a write destination for data are set. The monitor unit is configured to monitor the operating status of the plurality of storage devices and to set the operating status of the storage devices in the status table. The buffer memory is capable of holding data. The timer is configured to count previously set time in accordance with an instruction to start counting and to send a deadline notification when the previously set time has elapsed.

The command responding unit is configured such that, upon receiving a write command from the host system, the command responding unit instructs the timer to start counting, sets the write destination for data in the status table, outputs a control signal that gives an instruction to write data to the storage device of the write destination, holds in the buffer memory, write data sent from the host system within a certain period of time after the write command, and returns a write completion response corresponding to the write command to the host system when receiving the deadline notification from the timer. The data processing unit is configured such that, upon receiving the control signal that gives an instruction to write data from the command responding unit, the data processing unit refers to the status table to choose a storage device of the write destination and writes data read from the buffer memory to the chosen storage device.

Figure 1:
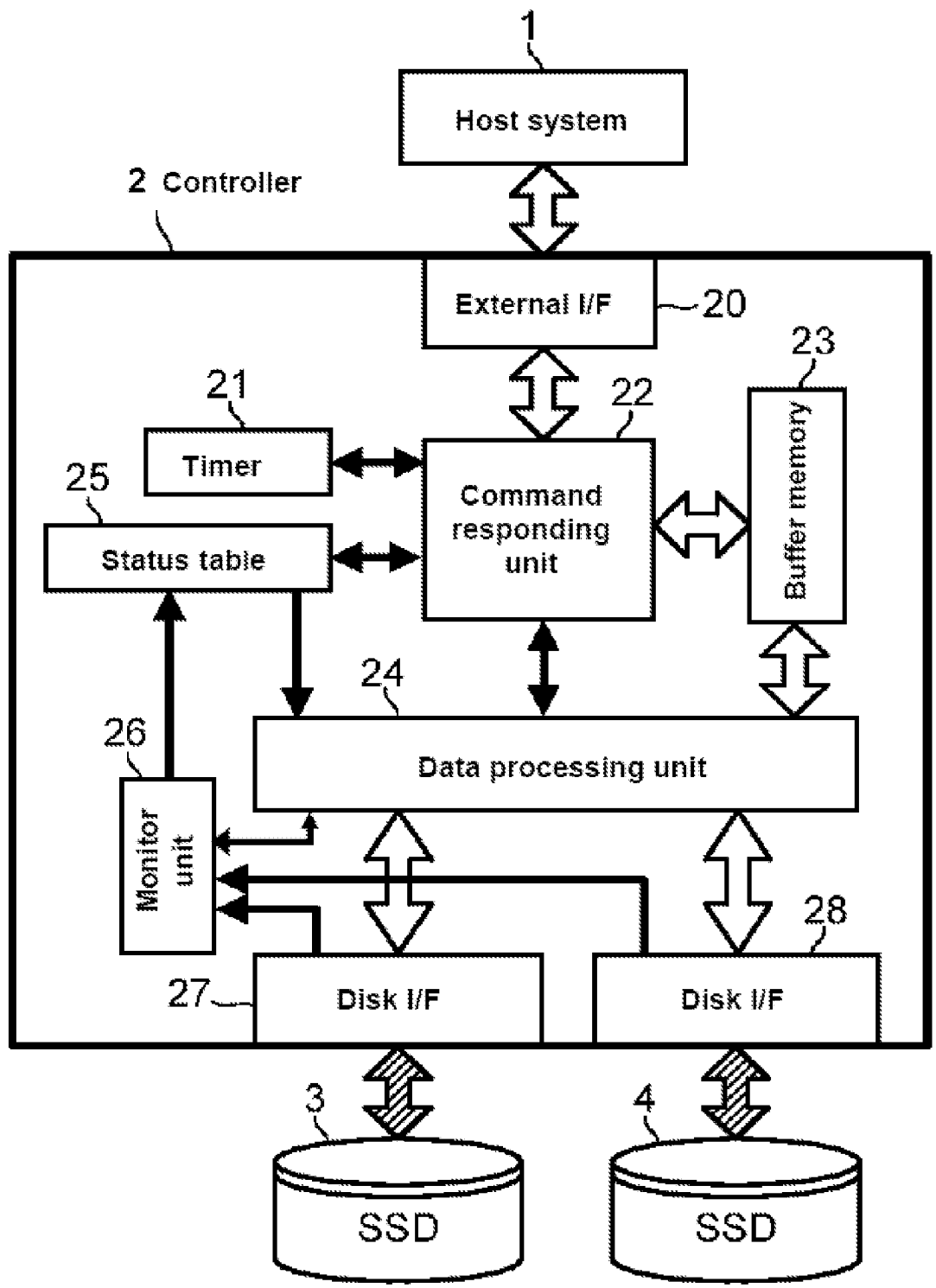
FIG. 1 illustrates a configuration of a controller of a first embodiment.

Hereinafter, a description is given in detail of embodiments with reference to the drawings. FIG. 1 illustrates a configuration of a controller 2 of an embodiment for storage devices.

As shown in FIG. 1, the controller 2 of this embodiment for storage devices includes an external interface 20 (hereinafter, referred to as an external I/F 20) connected to a host system 1, a timer 21, a command responding unit 22, a buffer memory 23, a data processing unit 24, a status table 25, a monitor unit 26, and disk interfaces 27 and 28 (hereinafter, referred to as disk I/Fs 27 and 28).

The host system 1 is a video server, for example. The host system 1 is a system for industrial use, such as a multimedia system, an information processing system, and a manufacturing plant system, and requires a guarantee of response time in the process of writing data to the storage devices or reading data from the storage devices.

The disk I/Fs 27 and 28 are interfaces for communication with external storage devices and are for example, serial ATA (SATA-2.6 or 3.0) or PCI-e ports. In this embodiment, the disk I/Fs 27 and 28 are connected to general purpose SSDs 3 and 4 as the external storage devices, respectively.

The external I/F 20 is an interface for communication with the host system 1 and is for example, a serial ATA (SATA-2.6 or 3.0) or PCI-e port.

The timer 21 is instructed by the command responding unit 22 to start a timer operation. When the counted time has reached deadline time T previously determined, the timer 21 sends a deadline notification to the command responding unit 22.

The host system 1 needs to complete the process of writing or reading data within allowed response time t, which is determined by system specifications. The deadline time T is set to time which is calculated by subtracting command transfer time (a certain period of time determined by the interface specifications) between the host system 1 and the command responding unit 22 from the allowed response time t. From the perspective of the host system 1, the controller 2 thereby controls the delay time of the external storage devices within a given time.

The time within which the host system 1 needs to receive a response depends on the intended use of the system. This time is, for example, 33 ms in a system handling videos and 1 to 10 ms in a data logger used in manufacturing plants.

The deadline time T is the maximum allowed delay time for returning a response to the host system 1. The deadline time T is previously set by the timer 21. The deadline time T may be externally written in a memory which can be referenced by the timer 21.

The timer 21 counts the previously set deadline time T (response time) upon receiving an instruction to start counting from the command responding unit 22. When the deadline time T has elapsed, the timer 21 sends the deadline notification to the command responding unit 22.

The command responding unit 22 sends and receives commands, responses, and data to and from the host system 1. In response to the command received from the host system 1, the command responding unit 22 sends to the data processing unit 24, a control signal which gives an instruction to write or read data.

Upon receiving a write command, which requests writing of data, from the host system 1, the command responding unit 22 sends to the timer 21, a control signal which gives an instruction to start counting.

Upon receiving the write command from the host system 1, the command responding unit 22 checks the operating status of the SSDs 3 and 4 (whether SSDs 3 and 4 are in "Waiting" or "Writing" status) with reference to the status table 25 and chooses a SSD of a write destination for data in accordance with the operating status. The command responding unit 22 then sets the write destination for data in the status table 25 and outputs a control signal which gives an instruction to write to the chosen SSD of the write destination (SSD 3 or SSD 4). The command responding unit 22 receives write data which are sequentially received within a certain unit time t after receiving the write command from the host system 1 and holds the write data received in a buffer memory 23. In the process of choosing the SSD of the write destination, when the operating status of the SSDs 3 and 4 is "Waiting", the command responding unit 22 changes an SSD operating status flag to "Writing" and changes the the write destination to another SSD.

On the other hand, upon receiving the deadline notification from the timer 21, the command responding unit 22 returns to the host system 1, a write completion response corresponding to the write command immediately after receiving the notification. In other words, the command responding unit 22 does not return the write completion response immediately after completing the holding (writing) of the write data to the buffer memory 23 and waits for the deadline time T as the response time of the system before returning the write completion response. This ensures a certain period of time till the deadline time T has elapsed after the process of receiving the write data is completed as a delay guaranteed time T1 (see FIG. 3) in the case where there is a delay in the process of writing data at the SSDs 3 and 4.

The buffer memory 23 is capable of holding data. The buffer memory 23 temporarily holds write data received from the host system 1.

Upon receiving the control signal which gives an instruction to write from the command responding unit 22, the data processing unit 24 chooses a writable SSD (any one of the SSDs 3 and 4) with reference to the status table 25 and writes to the chosen SSD, data which are read from the buffer memory 23. The data processing unit 24 is controlled by the control signal which gives an instruction to read, from the command responding unit 22 to read specified data from a readable SSD (the SSD 3 or 4).

The status table 25 includes the operating status of the SSDs 3 and 4 connected to the disk I/Fs 27 and 28 and the write destination of the SSDs 3 and 4. In the status table 25, flags for both the operating status and the write destination are set.

The monitor unit 26 monitors commands, inputs and outputs of data and responses to the disk I/Fs 27 and 28. That is to say, the monitor unit 26 monitors the SSDs 3 and 4 through the disk I/Fs 27 and 28 and sets the operating status of the SSDs 3 and 4 as the monitoring result in the status table 25.

The monitor unit 26 sets a flag indicating one of "Waiting" and "Writing" statuses (an operating status flag) as the operating status of the SSDs 3 and 4 in the status table 25. Specifically, when receiving Receivable response from the SSD 3 or 4, the monitor unit 26 changes the operating status flag from "Waiting" to "Writing". When receiving the write completion response from the SSD 3 or 4, the monitor unit 26 changes the operating status flag from "Writing" to "Waiting".

The operating status flag indicating the operating status of the SSDs 3, 4 are 0 or 1, for example. The operating status flag of 0 indicates "Waiting" (writing is not being performed for any one of the SSDs), and the operating status flag of 1 indicates "Writing" (data is being written to any one of the SSDs 3 and 4)

The write destination flag indicating the SSD to write to is 0 or 1, for example. The flag of 0 indicates that the write destination is the SSD 3 and the read source is the SSD 4. The flag of 1 indicates that the write destination is the SSD 4 and the read source is the SSD 3. Moreover, for example, the write destination flag of 0 means that data writing to the SSD 3 is enabled; data writing to the SSD 4 is disabled; and data reading from the SSD 4 is enabled.

The data processing unit 24 refers to the status table 25 to write in the writable SSD (any one of SSDs 3 and 4), data specified by the control signal which gives an instruction to write from the command responding unit 22. Moreover, the data processing unit 24 refers to the status table 25 to read from the readable SSD (any one of SSDs 3 and 4), data specified by the control signal which gives an instruction to read from the command responding unit 22.

The data processing unit 24 causes the plural SSDs 3 and 4, which are connected to the disk I/Fs 27 and 28, to include same data. Specifically, after writing data held by the buffer memory 23 to one of the SSDs, the data processing unit 24 reads the data from the buffer memory 23 and writes the same to the other SSD, thus achieving data synchronization at the plural SSDs 3 and 4.

Next, a description is given of operations of the controller 2 for storage devices according to the embodiment.

(Data Writing Operation)

Figure 3:
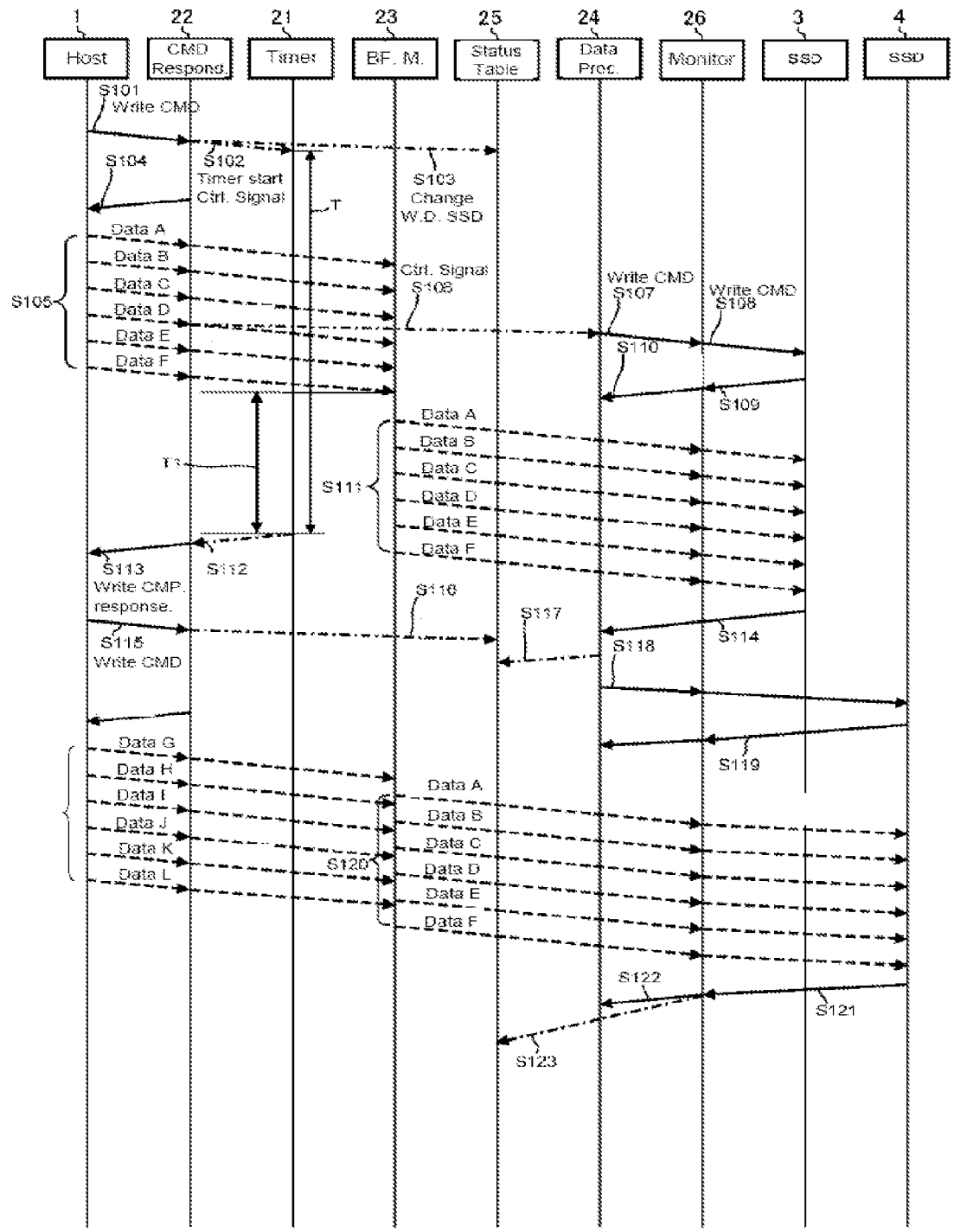
FIG. 3 is a sequence chart showing operations of respective units in a process of writing data.

First, a description is given of the writing operation with reference to FIG. 3.

In the case where the host system 1 writes data in the storage devices, the host system 1 sends a data write command to the command responding unit 22 (step S101 in FIG. 3).

Upon receiving the write command, the command responding unit 22 sends to the timer 21 a control signal which gives an instruction to start counting (step S102) and refers to the status table 25 to check whether the SSDs is in "Waiting" status (both SSDs 3 and 4 are waiting). When the SSDs are in "Waiting" status, the command responding unit 22 sends to the status table 25 a control signal which gives an instruction to change the write destination and thereby changes the write destination flag of the status table 25 (step S103).

For example, when receiving the write command while the write destination flag is 1 and the operating status flag is 0 (indicating "Waiting" status), the command responding unit 22 changes the write destination flag to 0. That is to say, the command responding unit 22 sets the SSD 3 write-enabled (sets the SSD 4 write-disabled). The timer 21 receives the control signal which gives an instruction to start counting and starts counting.

The command responding unit 22 returns Receivable response to the host system 1 (step S104). When the host system 1 receives Receivable response, write data is sequentially transmitted from the host apparatus 1 (step S105).

The command responding unit 22 sequentially holds data A to F, which are received from the host system 1, in the buffer memory 23 and sends to the data processing unit 24 a control signal which gives an instruction to write (step S106). The control signal which gives an instruction to write includes the write command received from the host system 1.

Upon receiving the control signal which gives an instruction to write from the command responding unit 22, the data processing unit 24 refers to the status table 25 to set the write destination to the SSD 3 based on the write destination flag and sends a write command to the SSD 3 through the monitor unit 26 and disk I/F 27 (steps S107 and S108).

The SSD 3 which has received the write command returns Receivable response. When Receivable response is received by the data processing unit 24 through the disk I/F 27 and monitor unit 26 (steps S109 and S110), the data processing unit 24 writes the data A to F, which are sequentially read out from the buffer memory 23, to the SSD 3 that is the write destination through the disk I/F 27 (step S111). Upon receiving Receivable response, the monitor unit 26 changes the operating status flag of the status table 25 from 0 (Waiting) to 1 (Writing).

On the other hand, when the deadline time T (response time) has elapsed since the start of counting, the timer 21 sends the deadline notification to the command responding unit 22 (step S112).

The command responding unit 22 does not return a write completion response even if all of the data A to F are stored in the buffer memory 23 and waits to receive the deadline notification from the timer 21. This waiting time serves as the delay guaranteed time T1 (see FIG. 3).

Upon receiving the deadline notification, the command responding unit 22 sends the write completion response to the host system 1 (step S113).

When completing the process of writing data, the SSD 3 returns a write completion response. This write completion response is received by the monitor unit 26 and data processing unit 24 through the disk I/F 27 (step S114). Upon receiving the write completion response, the monitor unit 26 changes the operating status flag of the status table 25 from 1 ("Writing" status) to 0 ("Waiting" status).

Upon receiving the write completion response from the command responding unit 22, the host system 1 sends a write command for next data. Upon receiving the command (step S115), the command responding unit 22 changes the write destination flag of the status table 25 from 0 (write to the SSD 3 is enabled) to 1 (write to the SSD 4 is enabled) (step S116).

Upon receiving the write completion response from the SSD 3, the data processing unit 24 checks the write destination flag of the status table 25 (step S117). Since the write destination flag is 1 (write to the SSD 4 is enabled), the data processing unit 24 sends the write command to the SSD 4 for data synchronization (step S118).

The SSD 4 which has received the write command returns Receivable response. When Receivable response is received by the data processing unit 24 through the disk I/F and monitor unit 26 (step S119), the data processing unit 24 sequentially reads out data A to F, which are held in the buffer memory 23, and writes the same to the SSD 4 that is the write destination through the disk I/F 28 (step S120). Upon receiving Receivable response, the monitor unit 26 changes the SSD operating status flag of the status table 25 from 0 ("Waiting") to 1 ("Writing").

When completing the process of writing data, the SSD 4 returns a write completion response. The write completion response is received by the monitor unit 26 and data processing unit 24 through the disk I/F 28 (steps S121 and S122). Accordingly, the same data A to F are written in the SSD 3 and SSD 4, thus implementing data synchronization between the SSD 3 and the SSD 4.

Upon receiving the write completion response, the monitor unit 26 changes the SSD operating status flag of the status table 25 from 1 ("Writing") to 0 ("Waiting") (step S123).

When the amount of data written in the buffer memory 23 exceeds a predetermined amount, the command responding unit 22 notifies the data processing unit 24 of information indicating such fact as a control signal.

(Data Reading Operation)

Figure 4:
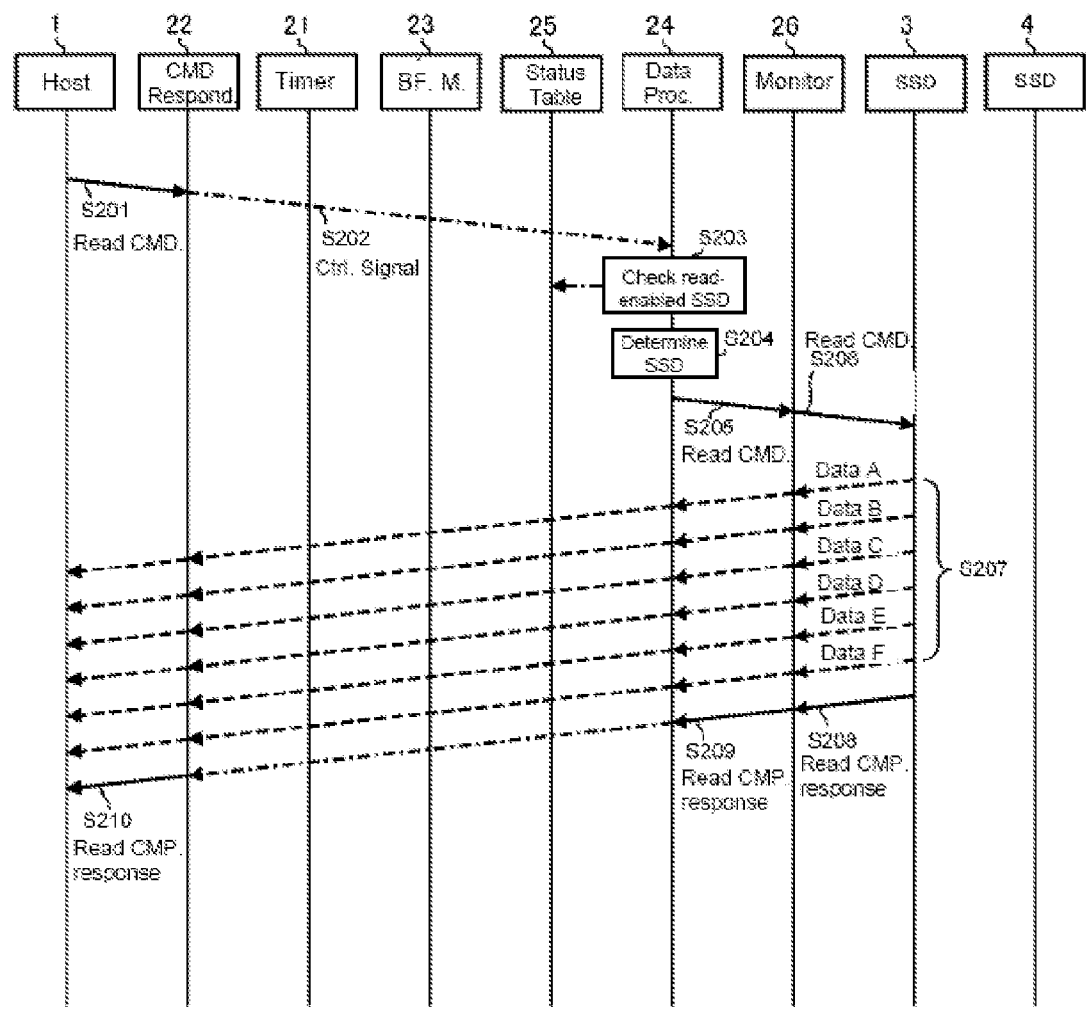
FIG. 4 is a sequence chart showing operations of respective units in a process of reading data.

Next, a description is given of a data reading operation with reference to FIG. 4.

In the case where the host system 1 reads out data from the storage device, the host device 1 sends a read command to the command responding unit 22 (step S201).

Upon receiving the read command sent from the host system 1, in accordance with the received read command, the command responding unit 22 sends a control signal which gives an instruction to read data to the data processing unit 24 (step S202). The control signal which gives an instruction to read data includes the read command transmitted from the host system 1.

Upon receiving the control signal which gives an instruction to read from the command responding unit 22, the data processing unit 24 refers to the status table 25 to check the SSD set read-enabled (step S203) and determines which SSD the data processing unit 24 can send the read command (step S204). The data processing unit 24 then sends the read command to the read-enabled SSD (SSD 3 or 4) through the monitor unit 26 and the disk I/F 27 or 28 (steps S205 and S206).

Herein, as the result of reference to the status table 25, it is assumed that the write destination flag is set to 1 (the SSD 4 is set write-enabled), that is, the SSD 3 is set read-enabled. In this case, the data processing unit 24 sends the read command to the SSD 3 through the monitor unit 26 and disk I/F 27.

The SSD 3, which has received the read command, sequentially reads data and sends the same to the disk I/F 27. The data processing unit 24 sends the data received through the disk I/F 27 to the command responding unit 22, and the command responding unit 22 sends the received data to the host system 1 through the external I/F 20 (step S207). In this case, the data received from the SSD 3 does not go through the buffer memory 23.

When completing the process of sending the data, the SSD 3 sends Read completion response through the disk I/F 27, monitor unit 26, and data processing unit 24 to the command responding unit 22 (steps S208 and S209). The command responding unit 22 sends Read completion response to the host system 1 (step S210).

Figure 5:
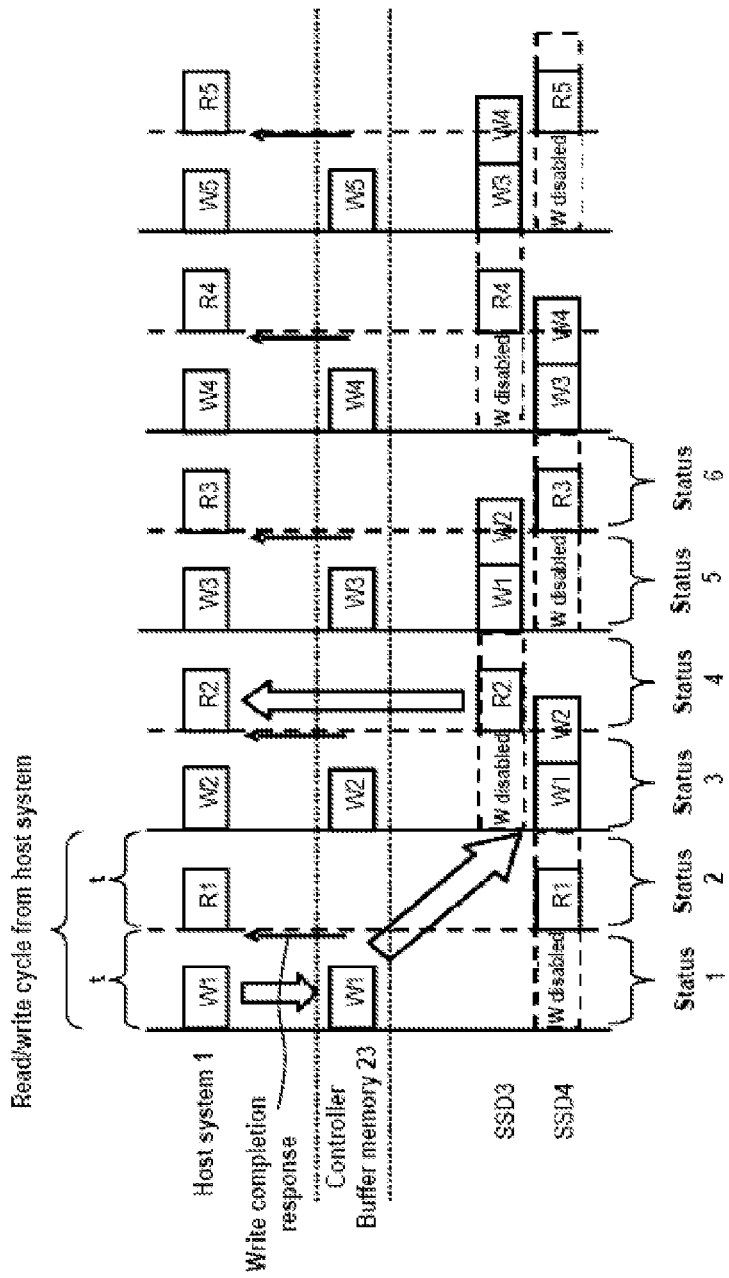
FIG. 5 is a time chart when there is no delay in a process of writing data to a SSD.
Figure 6A:
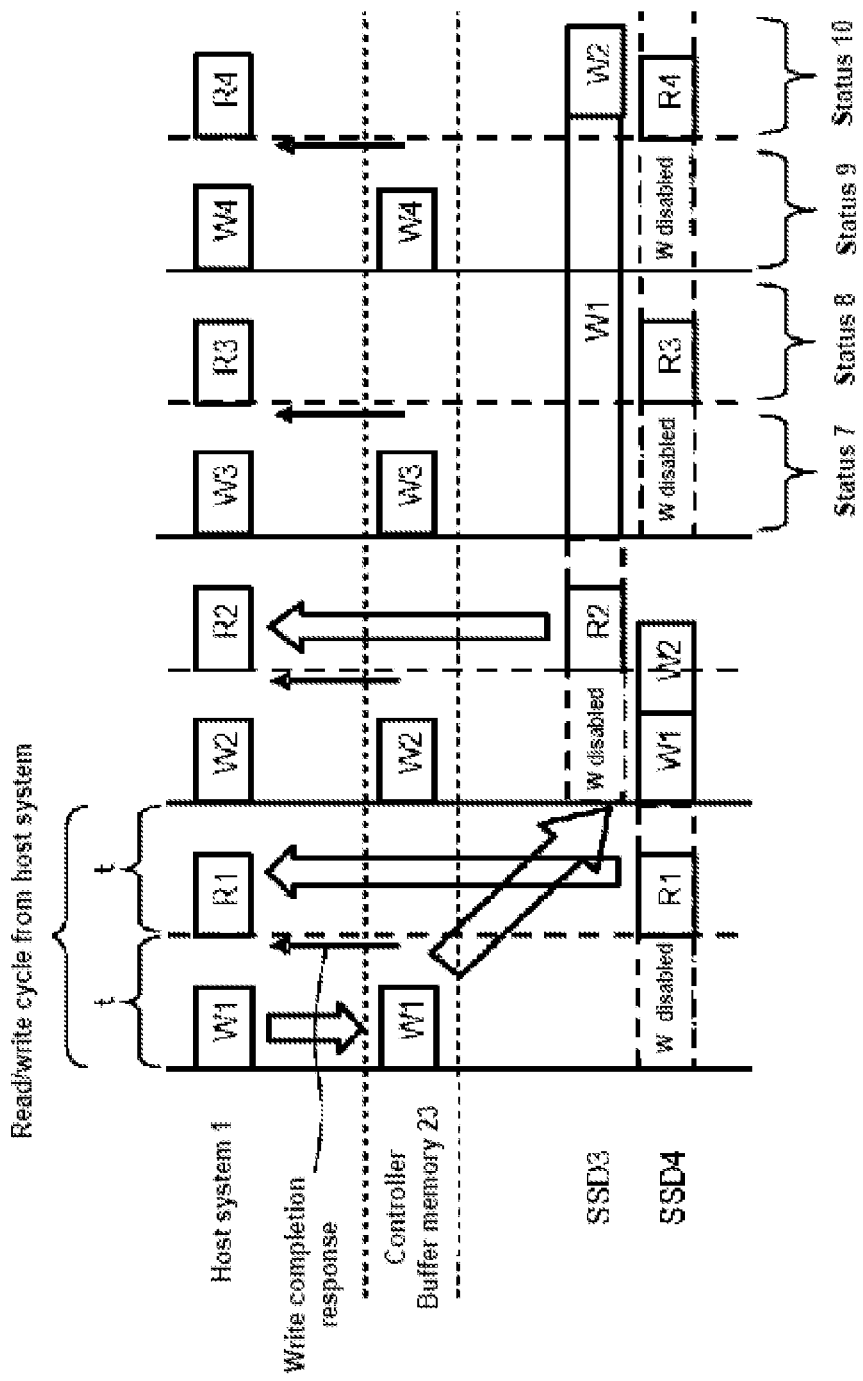
FIGS. 6A and 6B are time charts when there is a delay in a process of writing data to a SSD.
Figure 6B:
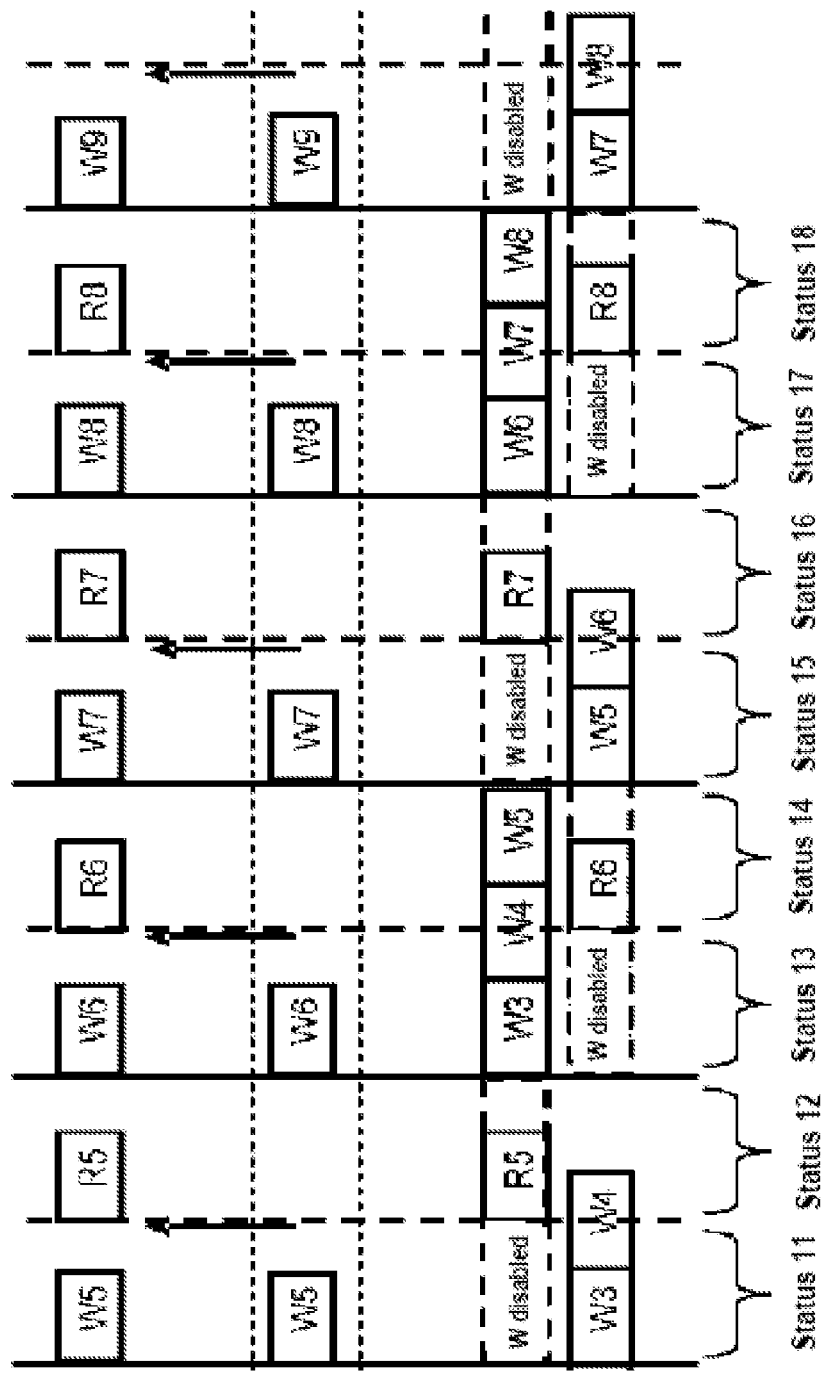

Herein, a description is given of changes in state in the case where there is a delay in the process of writing to the SSD 3 or 4 with reference to FIGS. 5, 6A, and 6B. FIGS. 6A and 6B are a series of time charts.

First, with reference to FIG. 5, a description is given of changes in state in the case where there is no delay in the process of writing to the SSD 3 or 4.

In the drawings, Wn (n=1, 2, 3 . . . ) and Rn (n=1, 2, 3 . . . ) indicate time in the process of writing and time in the process of reading, respectively, and changes in state through time are sequentially described. A data set written at time Wn is referred to as a data set (Wn), and a data set specified to be read at the time Wn is referred to as a data set (Rn). In FIGS. 5, 6A, and 6B, the data set written at the time Wn is indicated by just Wn, and the data specified to be read at the time Rn is indicated by just Rn.

In State 1, a write command is issued by the host system 1. The command responding unit 22 receives the write command, sends a control signal to start counting to the timer 21, and holds data (W1) in the buffer memory 23. When the command responding unit 22 completes the process of receiving the data (W1) and receives the deadline notification from the timer 21 after the elapse of the predetermined deadline time T, the command responding unit 22 sends the write completion response to the host system 1.

In State 2, a read command is issued from the host system 1. Since the write destination flag is 0, the data (R1) is read from the SSD 4 and the data (R1) is sent to the host system 1.

In State 3, a write command is issued from the host system 1, and the data (W2) is held in the buffer memory 23. At the same time, the data (W1), which is written in the buffer memory 23 in State 1, is written to the write-enabled SSD 4 with reference to the write destination flag of the status table 25. If the SSD operating status flag of the status table 25 is 0 ("Waiting" status) when the write command is received from the host system 1, the command responding unit 22 changes the write destination flag from 0 to 1, that is, changes the write destination from the SSD 3 to the SSD 4.

After the holding of the data (W2) in the buffer memory 23 is completed, the data (W2) in the buffer memory 23 is written to the SSD 4. In other words, the data (W1, W2) are written to the SSD 4 until the write data (W2) from the host system 1 corresponds to the write data written in the SSD 4 (W1, W2).

In State 4, in response to the read command from the host system 1, data (R2) is read from the SSD 3, which is set write-disabled, and is sent to the host system 1. In this process, at the other SSD 4, the data (W2) is being written in some cases.

In State 5, a write command is issued from the host system 1, and data (W3) is held in the buffer memory 23. In this process, the write destination flag of the status table 25 is changed from 1 to 0, that is, the write destination is changed from the SSD 4 to the SSD 3. In other words, the SSD set write-disabled is changed from the SSD 3 to the SSD 4. The data (W1 and W2) held in the buffer memory 23 at States 1 and 3 are written to the SSD 3, which is write-enabled.

The data (W1, W2) are written to the SSD 3 until the previous write data (W2) corresponds to the write data written in the SSD 3. The data included in the SSD 4 is therefore synchronized with the data included in the SSD 3.

In State 6, the process of reading is performed in a similar manner to State 4. Subsequently, States 3 to 6 are repeated.

Next, a description is given of changes in state in the case where there is a delay in the process of writing to the SSD 3 or 4 with reference to FIGS. 6A and 6B.

In State 7, after a write command from the host system 1 is received, data (W3) transmitted from the host system 1 is held in the buffer memory 23. In this process, the write destination flag of the status table 25 is changed from 1 to 0, that is, the write destination is changed from the SSD 4 to the SSD 3. In other words, the write-disabled SSD is changed from the SSD 3 to the SSD 4. At the same time, data (W1) is written to the SSD 3. However, it is assumed that there is a delay in the process of writing the data (W1) to the SSD 3 and the process of writing continues to next State 10.

In State 8, data (R3) is read from the SSD 4 in response to a read command from the host system 1 and is sent to the host system 1. In this process, at the SSD 3, the process of writing the data (W1) is continuing.

In State 9, after the write command from the host system 1 is received, data (W4), which is sent from the host system 1, is held in the buffer memory 23. At the same time, the process of writing the data (W1) to the SSD 3 is still continuing.

When the process of writing data to the SSD 3 continues from the previous State, the write destination (the write-disabled setting) is not changed. In this case, the SSD 4 remains write-disabled. Moreover, the setting specifying a SSD to which data is written until the written data corresponds to the write data from the host system 1 is changed. Specifically, after the foregoing setting is changed, write data from the host device 1 is written to the SSD 3 until the write data from the host device 1 corresponds to the write data written in the SSD 3, and previous write data is written to the SSD 4 until the write data written in the SSD 4 corresponds to the previous write data.

In State 10, data (R4) is read from the SSD 4 in response to the read command from the host system 1. At this time, since the SSD set write-disabled is not changed in State 9, data is read out from the SSD 4, which is similar to State 8.

In this process, at the other SSD 3, the process of writing data continues. If there is time until the next write command is issued from the host system 1 when the process of writing the data (W1) is completed, the data (W2) is written in the SSD 3.

In State 11, a write command from the host system 1 is received, and the write-disabled SSD is changed from the SSD 4 to the SSD 3. Thereafter, data (W5) transmitted from the host system 1 is held in the buffer memory 23.

At the same time, the data (W3 and W4) held in the buffer memory 23 is written to the SSD 4, which is set write-enabled.

Since the range of write data to be written to the SSD 3 and the range of write data to be written to the SSD 4 are changed in State 9, the data (W3, W4) is written to the SSD 4 until the previous data (W4) from the host system 1 corresponds to the data written in the SSD 4.

In State 12, the basic operation of the process of reading is performed.

In State 13, after a write command from the host system 1 is received, data (W6) transmitted from the host system 1 is held in the buffer memory 23.

At the same time, the data (W3, W4, and W5) held in the buffer memory 23 are written to the SSD 3.

By time point of time, the process of writing data to the SSD 3 does not yet catch up with the write data transmitted from the host system 1, and the next data (W4 and W5) are therefore also written to the SSD 3.

In State 14, the basic operation of the process of reading is performed. At this point of time, since the process of writing data to the SSD 3 does not yet catch up with the write data transmitted from the host apparatus 1, the next data (remaining part of W4 and W5) are written to the SSD 3.

States 15 to 18 are the same operations as those of States 11 to 14. The aforementioned operations are repeated until the write data in the SSD 3 catch up with the write data from the host system 1 like State 18. Thereafter, the operation returns to the operation similar to the basic operation.

According to the first embodiment, as described above, data synchronization is implemented using two SSDs 3 and 4. By writing data to the waiting one of the SSDs and reading data from the other SSD, which is set write-disabled, the storage devices can be applied to the process of reading data in real-time control.

In response to a write command from host system 1, the data from the host system 1 is held in the buffer memory 23, and the data from the buffer memory 23 is properly written to the SSDs 3 and 4 with the write and read statuses of the SSDs 3 and 4 being changed, so that delay caused in the SSDs 3 and 4 is absorbed. In other words, by separating the process for the SSD 3, 4 and process for the host system in the controller 2 for storage devices, the delay in response of the SSDs 3 and 4 is prevented from influencing the host system 1, and delays in the SSDs for the host system 1 can be absorbed within the predetermined response allowed time.

Moreover, in the process of writing data by the host system 1, even when holding of the data transmitted from the host system 1 in the buffer memory 23 is completed, the write completion response is not immediately returned. The write completion response for the data is returned to the host system 1 in synchronization with the cycle at which the host system 1 transmits data. Thereby transmission of nest data by the host system 1 is controlled. Even if there is a delay in the process of writing data in the SSD 3 or 4, the received data does not accumulate excessively in the buffer memory 23, thus absorbing the influence of the delay. This allows the general SSDs 3 and 4, which are not guaranteed in delay time, to be used in real-time control.

Moreover, according to the controller 2 for storage devices of this embodiment, the following effects can be obtained.

1) Connecting the controller 2 to the general-purpose storage devices (SSDs and HDDs) can eliminate the influence of delays occurring in the storage devices in the process of writing and reading data.
2) Only by changing the functions of the disk I/Fs 27 and 28 of the controller 2, the controller 2 can be applied to every storage device standardized in the present and the future. Accordingly, it is possible to easily replace the storage devices with new-generation storage devices.
3) The controller 2 can be implemented as an extended function of computers, servers, and the like and can be easily incorporated in industrial indent equipment.

According to the embodiment, it is possible to provide the controller 2 allowing storage devices such as general-purpose SSDs to be used in real-time control and the delay guarantee method by the controller 2.

Figure 7:
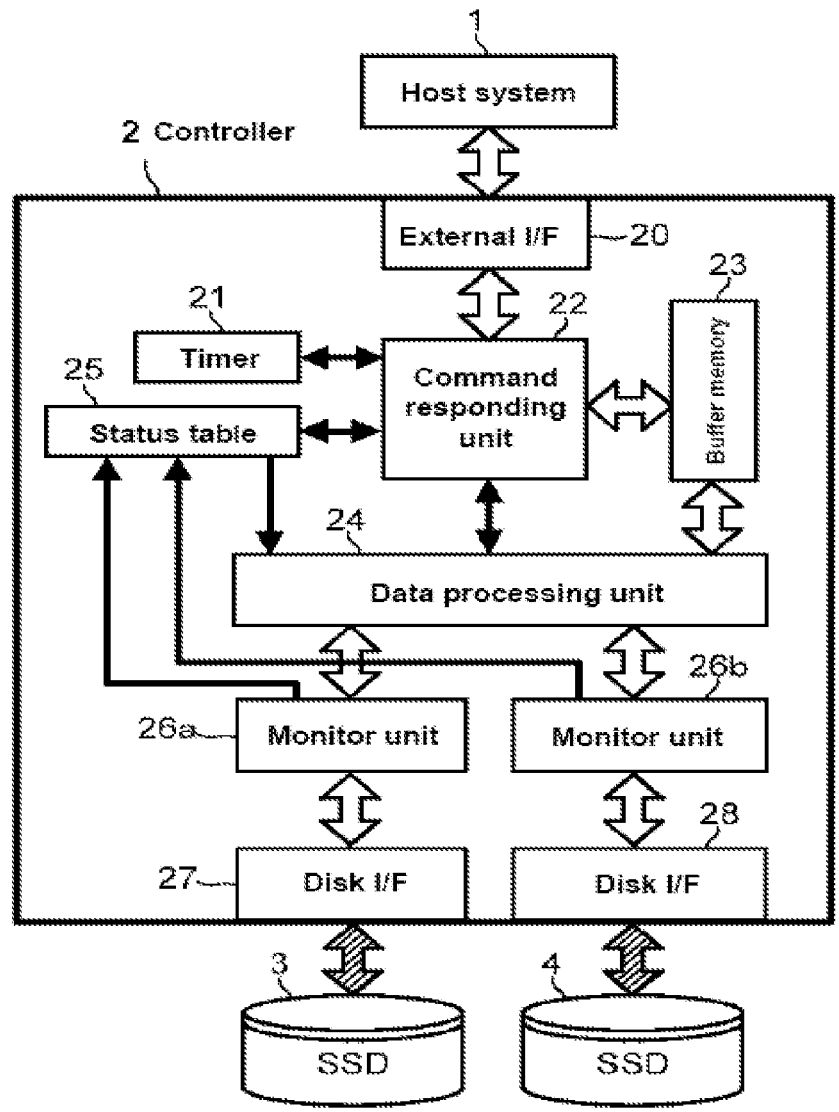
FIG. 7 illustrates a configuration of a controller of a second embodiment.

Next, a description is given of a second embodiment with reference to FIG. 7. This second embodiment is a modification of the first embodiment.

As shown in FIG. 7, a controller 2 of the second embodiment includes monitor units 26*a* and 26*b* between the data processing unit 24 and the disk I/Fs 27 and 28, respectively.

According to this second embodiment, similar to the first embodiment, general-purpose storage devices can be used in real-time control. Moreover, according to the second embodiment, by providing the monitor units 26*a* and 26*b* between the data processing unit 24 and the disk I/Fs 27 and 28 to monitor streams of data and commands of the respective disk I/Fs 27 and 28, the load on each monitor unit 26*a* and 26*b* can be reduced. Furthermore, according to the second embodiment, it is possible to use relatively inexpensive parts and contribute cost reduction.

Figure 8:
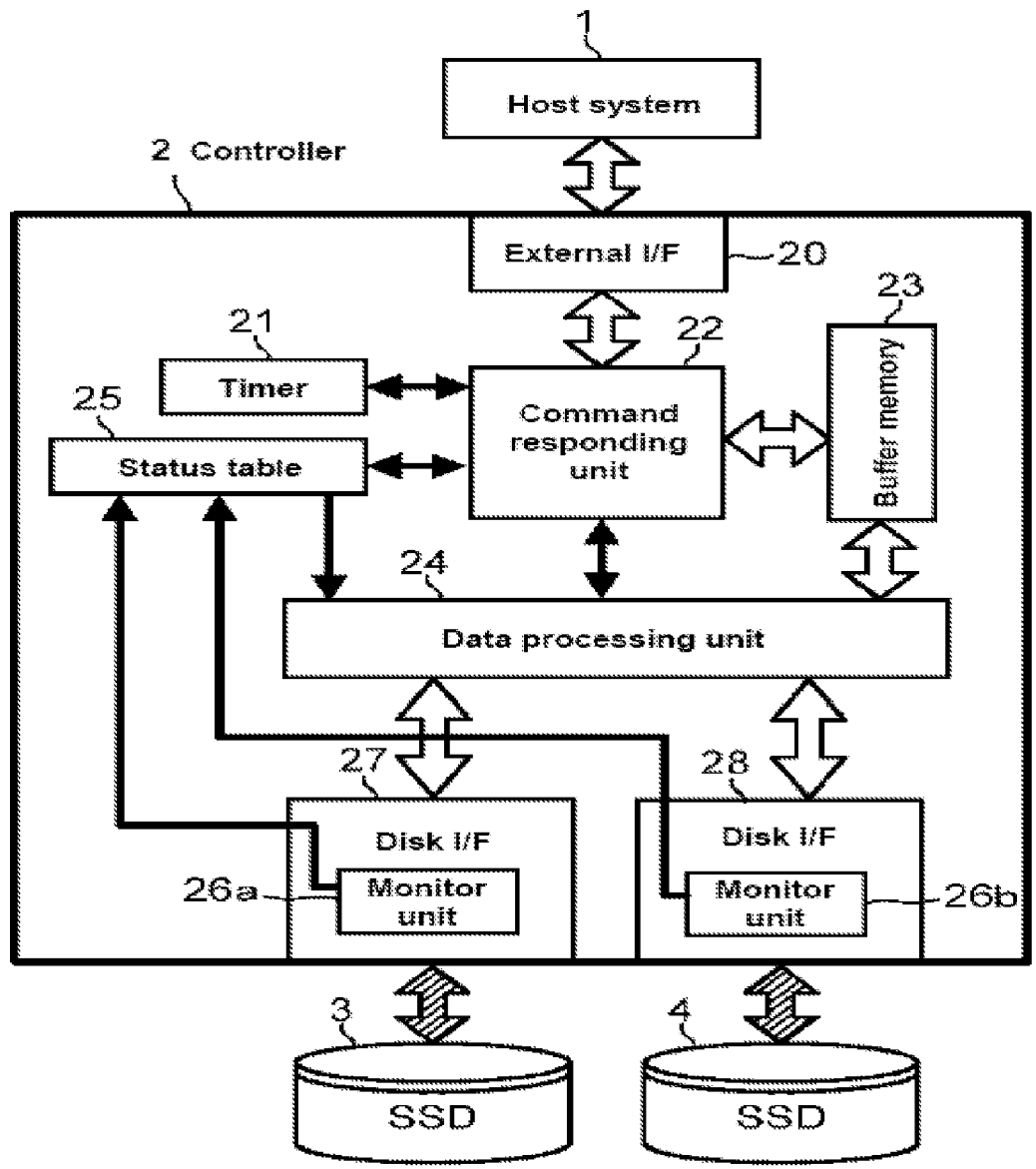
FIG. 8 illustrates a configuration of a controller of a third embodiment.

Next, a description is given of a third embodiment with reference to FIG. 8. The third embodiment is a modification of the second embodiment.

As shown in FIG. 8, a controller 2 of the third embodiment includes monitor units 26*a* and 26*b* within the disk I/Fs 27 and 28. The disk I/Fs 27 and 28 employ SATA standards. The monitor units 26*a* and 26*b* have a function to monitor transmission of FIS commands between the transport layer and link layer in the SATA standards.

The monitor units 26*a* and 26*b* have a function to calculate a period between the time when a FIS command is sent from the disk I/F 27 or 28 to the SSD 3 or 4 and the time when the disk I/F 27 or 28 received responses from the SSD 3 or 4 as delay times, respectively and output the calculated delay times to the data processing unit 24 as monitoring information.

According to the third embodiment, similar to the first embodiment, general-purpose storage devices can be used in real-time control. According to the third embodiment, moreover, by providing the monitor units 26*a* and 26*b* within the disk I/Fs 27 and 28, the unit can be reduced in size.

Figure 9:
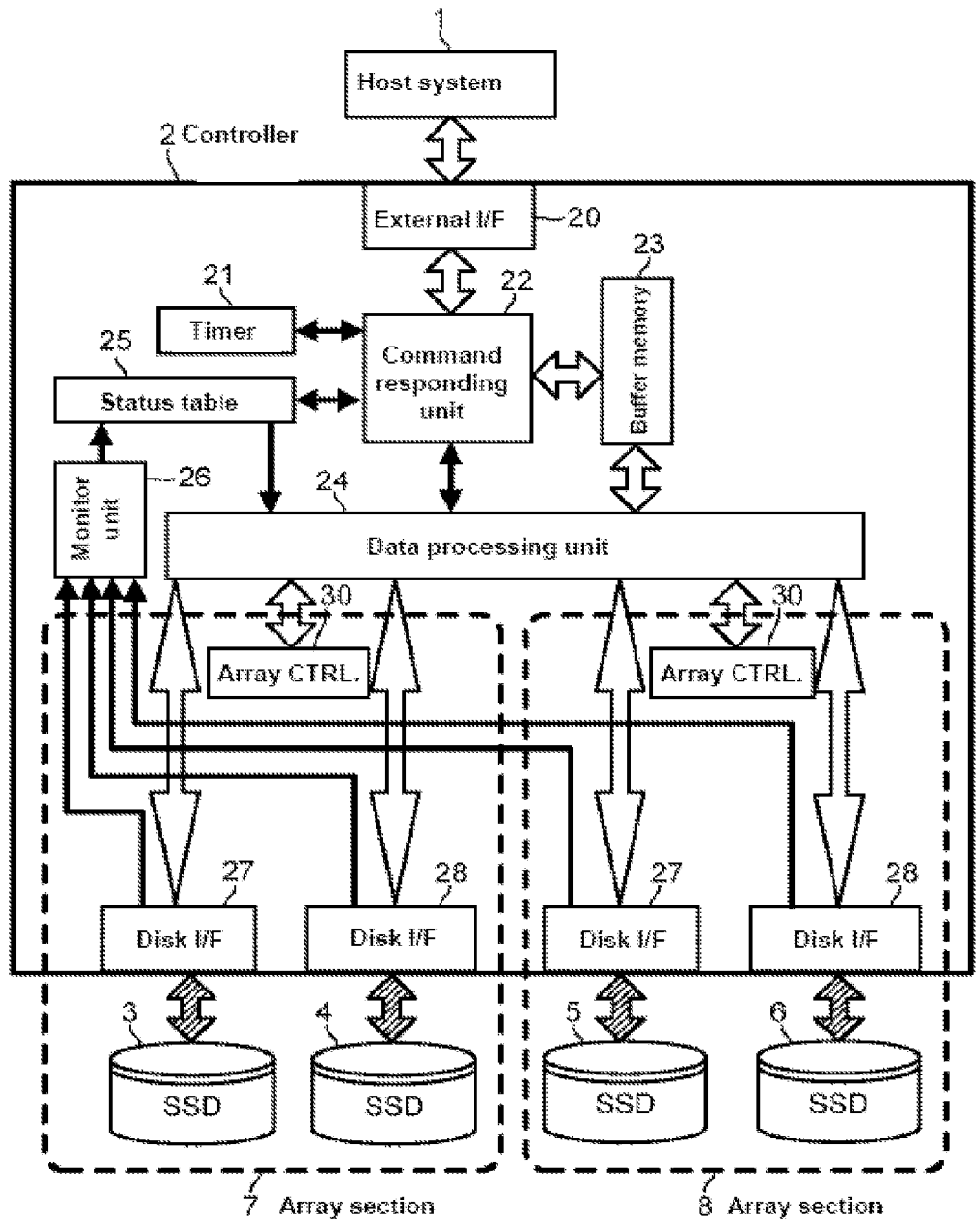
FIG. 9 illustrates a configuration of a controller of a fourth embodiment.

Next, a description is given of a fourth embodiment with reference to FIG. 9. The fourth embodiment is a modification of the second embodiment. A controller 2 of the fourth embodiment is a configuration example in the case where the controller 2 is connected to four SSDs 3 to 6.

As shown in FIG. 9, in the controller 2 of the fourth embodiment, the four SSDs 3 to 6 are divided into two arrays. Each array includes two SSDs. The individual arrays can perform operations of RAID0 and RAID1.

The array section 7 includes disk I/Fs 27 and 28 respectively connected to the two SSDs 3 and 4 and an array control unit 30.

The array section 8 includes disk I/Fs 27 and 28 respectively connected to the two SSD 5 and 6 and an array control unit 30. The array sections 7 and 8 perform control of respective arrays.

In this embodiment, the array sections 7 and 8 are controlled in a similar manner to the SSDs 3 and 4 of the aforementioned embodiments.

A description is given of the operations of the fourth embodiment. For easy understanding of explanation, the description is given of the array section 7.

At the fourth embodiment, in the case of control as RAID0, data written by the data processing unit 24 is divided into data sets of certain sizes, which are written in the SSD 3 and 4. This can increase the transmission speed.

In the event of reading data from the SSDs 3 and 4, the target data sets are read from the SSD 3, 4 and are combined, and combined data is outputted to the data processing unit 24. This can increase the transmission speed.

On the other hand, in the case of control as RAID1, the data written by the data processing unit 24 is written in the SSDs 3 and 4.

In such a case, when one of the SSDs 3 and 4 is broken, data can be written to and read from the other SSD (the SSD 3 or 4), and the reliability as the storage system can be enhanced.

According to the fourth embodiment, similar to the first embodiment, general-purpose storage devices can be used in real time control.

While certain embodiments have been described, those embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Also, the component elements shown in the above-described embodiments may be implemented by a program installed in a storage such as a hard disk device of a computer. Alternatively, the functions of the present invention are implemented by a computer in such a manner that a program is stored in computer readable electronic media and the computer is caused to read the program from the electronic media. The electronic media includes, for example, recording media such as CD-ROM, flash memory, removable media, or the like. Furthermore, the functions of the present invention may be implemented in such a manner that the component elements are stored in a distributed manner in different computers connected via a network and then communications are performed among the computers causing the components to function.

What is claimed is:

1. A controller which can be connected to a host system and a plurality of storage devices, the controller comprising:
a status table in which an operating status of the plurality of storage devices and a write destination for data are set;
a monitor configured to monitor the operating status of the plurality of storage devices and to set the operating status of the storage devices in the status table;
a buffer memory capable of holding data;
a timer configured to count to a previously set time in accordance with an instruction to start counting and to send a deadline notification when the previously set time has elapsed;
a command responding unit configured such that, upon receiving a write command from the host system, the command responding unit instructs the timer to start counting, sets the write destination for data in the status table, outputs a control signal that gives an instruction to write data to the storage device of the write destination, holds in the buffer memory, write data sent from the host system within a certain period of time after the write command, and returns a write completion response corresponding to the write command to the host system when receiving the deadline notification from the timer; and
a data processor configured such that, upon receiving the control signal that gives an instruction to write data from the command responding unit, the data processor refers to the status table to choose a storage device of the write destination and writes data read from the buffer memory to the chosen storage device.

2. The controller according to claim 1, wherein setting the operating status of the storage devices comprises setting a flag indicating any one of "waiting" and "writing".

3. The controller according to claim 1, wherein when receiving the write command from the host system, the command responding unit refers to the status table to check the operating status of the storage devices, and if the operating status is "waiting", the command responding unit changes the write destination for data in the status table.

4. The controller according to claim 1, wherein
the plurality of storage devices include first and second storage devices, and
data synchronization is performed between the first and second storage devices by writing the data received from the host system and held in the buffer memory to the first storage device, and then reading the held data from the buffer memory and writing the data to the second storage device.

5. The controller according to claim 1, the storage devices are general-purpose solid state disks.

6. The controller according to claim 1, wherein the control signal which gives an instruction to write data includes the write command received by the command responding unit from the host system, and the data processor sends the write command to the storage device.

7. A control method comprising the steps of:
monitoring an operating status of a plurality of storage devices and setting an operating status of the storage devices in a status table by a monitor;
when a host system gives a write request, instructing a timer to start counting, setting a write destination for data in the status table, outputting a control signal that gives an instruction to write data to the storage device of the write destination, and, within a certain period of response time after the write request, holding in a buffer memory, data sent from the host system by a responding unit;
counting the response time with the timer previously set upon an instruction to start counting and to send a deadline notification to the responding unit when the previously set response time has elapsed;
choosing a writable storage device by a data processing unit which has received the control signal based on the operating status of the storage devices and the write destination for data by referring to the status table, and writing the data read from the buffer memory to the chosen storage device; and
when the deadline notification is sent from the timer to the responding unit, returning a write completion response corresponding to the write request to the host system, by the responding unit.

8. The method according to claim 7, wherein setting the operating status of the storage devices comprises setting a flag indicating any one of "waiting" and "writing".

9. The method according to claim 7, further comprising when a host system gives a write request referring to the status table to check the operating status of the storage devices, and if the operating status is "waiting", changing the write destination for data in the status table.

10. The method of claim 7 wherein
the plurality of storage devices include first and second storage devices, and
data synchronization is performed between the first and second storage devices by writing the data received from the host system and held in the buffer memory to the first storage device, and then reading the held data from the buffer memory and writing the data to the second storage device.

11. The method of claim 7 wherein the storage devices are general-purpose solid state disks.

12. A controller comprising:
a status table in which an operating status of a plurality of storage devices and a write destination for data are set;
a monitor configured to monitor the operating status of the plurality of storage devices and to set the operating status of the storage devices in the status table;
a buffer memory capable of holding data;
a timer configured to count to a previously set time in accordance with an instruction to start counting and to send a deadline notification when the previously set time has elapsed;

a commander configured to instruct the timer to start counting, set the write destination for data in the status table, output a control signal that gives an instruction to (1) write data to the storage device of the write destination, (2) write data sent from the host system within a certain period of time after the write command, and (3) return a write completion response corresponding to the write command to a host system when receiving the deadline notification from the timer; and a data processor configured such that, upon receiving the control signal, refers to the status table to choose a storage device for the write destination and writes data read from the buffer memory to the chosen storage device.

13. The controller according to claim 12, wherein setting the operating status of the storage devices comprises setting a flag indicating any one of "waiting" and "writing".

14. The controller according to claim 12, wherein when receiving the write command from the host system, the commander refers to the status table to check the operating status of the storage devices, and if the operating status is "waiting", the commander changes the write destination for data in the status table.

15. The controller according to claim 12, wherein
the plurality of storage devices include first and second storage devices, and
data synchronization is performed between the first and second storage devices by writing the data received from the host system and held in the buffer memory to the first storage device, and then reading the held data from the buffer memory and writing the data to the second storage device.

16. The controller according to claim 12, the storage devices are general-purpose solid state disks.

17. The controller according to claim 12, wherein the control signal includes the write command received by the commander from the host system, and the data processor sends the write command to the storage device.

* * * * *